United States Patent
Tsirkin

(10) Patent No.: US 9,203,750 B2
(45) Date of Patent: Dec. 1, 2015

(54) ETHERNET FRAME TRANSLATION TO INTERNET PROTOCOL OVER INFINIBAND

(71) Applicant: Red Hat Israel, Ltd., Raanana (IL)

(72) Inventor: Michael Tsirkin, Yokneam Yllit (IL)

(73) Assignee: Red Hat Israel, Ltd., Raanana (IL)

( * ) Notice: Subject to any disclaimer, the term of this patent is extended or adjusted under 35 U.S.C. 154(b) by 189 days.

(21) Appl. No.: 13/766,340

(22) Filed: Feb. 13, 2013

(65) Prior Publication Data

US 2014/0226659 A1   Aug. 14, 2014

(51) Int. Cl.
*H04L 12/70* (2013.01)
*H04L 12/741* (2013.01)
*H04L 12/46* (2006.01)

(52) U.S. Cl.
CPC ............ *H04L 45/74* (2013.01); *H04L 12/4625* (2013.01); *H04L 12/4633* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 7,983,275 B2 * | 7/2011 | Davis ....................... | 370/395.53 |
| 2002/0165978 A1 * | 11/2002 | Chui ............................. | 709/238 |
| 2003/0061379 A1 * | 3/2003 | Craddock et al. ............. | 709/238 |
| 2004/0128398 A1 * | 7/2004 | Pettey ........................... | 709/249 |
| 2009/0141727 A1 * | 6/2009 | Brown et al. ............ | 370/395.31 |
| 2009/0141734 A1 * | 6/2009 | Brown et al. ................. | 370/419 |
| 2012/0314706 A1 * | 12/2012 | Liss et al. ...................... | 370/392 |
| 2013/0343391 A1 * | 12/2013 | Goode et al. .................. | 370/392 |
| 2014/0122675 A1 * | 5/2014 | Cohen et al. .................. | 709/223 |

OTHER PUBLICATIONS

Chapter 3 of cw.ininibandta.org/document/dl/7143 Infiniband architecture.
Message to gmane.linux.network newsgroup at permalink.gmane.org/gmane.linux.network/240612 (Aug. 20, 2012).
Request for Comments: 4391 by Internet Engineering Task Force, tools.ietf.org/pdf/rfc4391.pdf (Apr. 2006).
Request for Comments: 4392 by Internet Engineering Task Force, tools.ietf.org/pdf/rfc4392.pdf (Apr. 2006).
Request for Comments: 4755 by Internet Engineering Task Force, tools.ietf.org/pdf/rfc4755.pdf (Dec. 2006).
Co-pending U.S. Appl. No. 13/777,891, filed Feb. 26, 2013.
An I/O virtualization framework for Linux: ibm.com/developerworks/library/l-virtio/ (Jan. 29, 2010).
InfiniBand Trade Association, "InfiniBand Architecture Specification", vol. 1, Release 1.2.1 (Nov. 2007), pp. 88-142.
Message to gmane.linux.network newsgroup at http://article.gmane.org/gmane.linux.network/239839/match=showing+could+build+protocol+does+work. Aug. 13, 2013.
Ayoub, A., "Ethernet Services over IPoIB", (Mar. 2012), Retrieved from OpenFabrics Alliance website: https://www.openfabrics.org/ofa-documents/presentations/doc_download/510-ethernet-tunneling-over-ipoib.html.

* cited by examiner

*Primary Examiner* — Chi H Pham
*Assistant Examiner* — Shick Hom
(74) *Attorney, Agent, or Firm* — Lowenstein Sandler LLP

(57) ABSTRACT

Systems and methods for Ethernet frame translation to Internet Protocol over Infiniband (IPoIB). An example method may comprise receiving, by a computer system, a network frame comprising a payload and a header including a destination address, determining an IB link layer address corresponding to the destination address, and encapsulating the payload into an Infiniband over Internet Protocol (IPoIB) frame including the IB link layer address.

25 Claims, 6 Drawing Sheets

US 9,203,750 B2

ETHERNET FRAME TRANSLATION TO INTERNET PROTOCOL OVER INFINIBAND

TECHNICAL FIELD

The present disclosure is generally related to computer networking, and is more specifically related to systems and methods for Ethernet frame translation to Internet Protocol over Infiniband (IPoIB).

BACKGROUND

Infiniband (IB) architecture developed by the Infiniband Trade Association (IBTA) defines a System Area Network (SAN) for interconnecting processor nodes and input/output (I/O) nodes through an IB fabric made of cascaded switches. Each IB node or switch may attach to a single or multiple switches or directly to another IB node or switch. An IB node connects to the fabric via a host channel adapter. Two or more IB subnets may be interconnected by one or more IB routers.

An IB endpoint may be identified by a queue pair number (QPN) and a port identifier. The latter may include a local identifier (LID) and a global identifier (GID). A LID is a 16-bit value that may be assigned when the corresponding port becomes active. A GID is a 128-bit value that may be formed by concatenating a 64-bit IB subnet prefix and a 64-bit GUID (Global Unique Identifier). Both GID and LID may be assigned by a subnet manager, which is a component performing configuration and control of the subnet.

IB architecture supports several methods of data transfer, also referred to as IB transports, including unreliable datagram, reliable datagram, reliable connected, and unreliable connected. Unreliable datagram mode is universally supported by all IB nodes, and hence is used for Internet Protocol over Infiniband (IPoIB) implementation defined in RFC-4391 and RFC-4392 by Internet Engineering Task Force (IETF).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
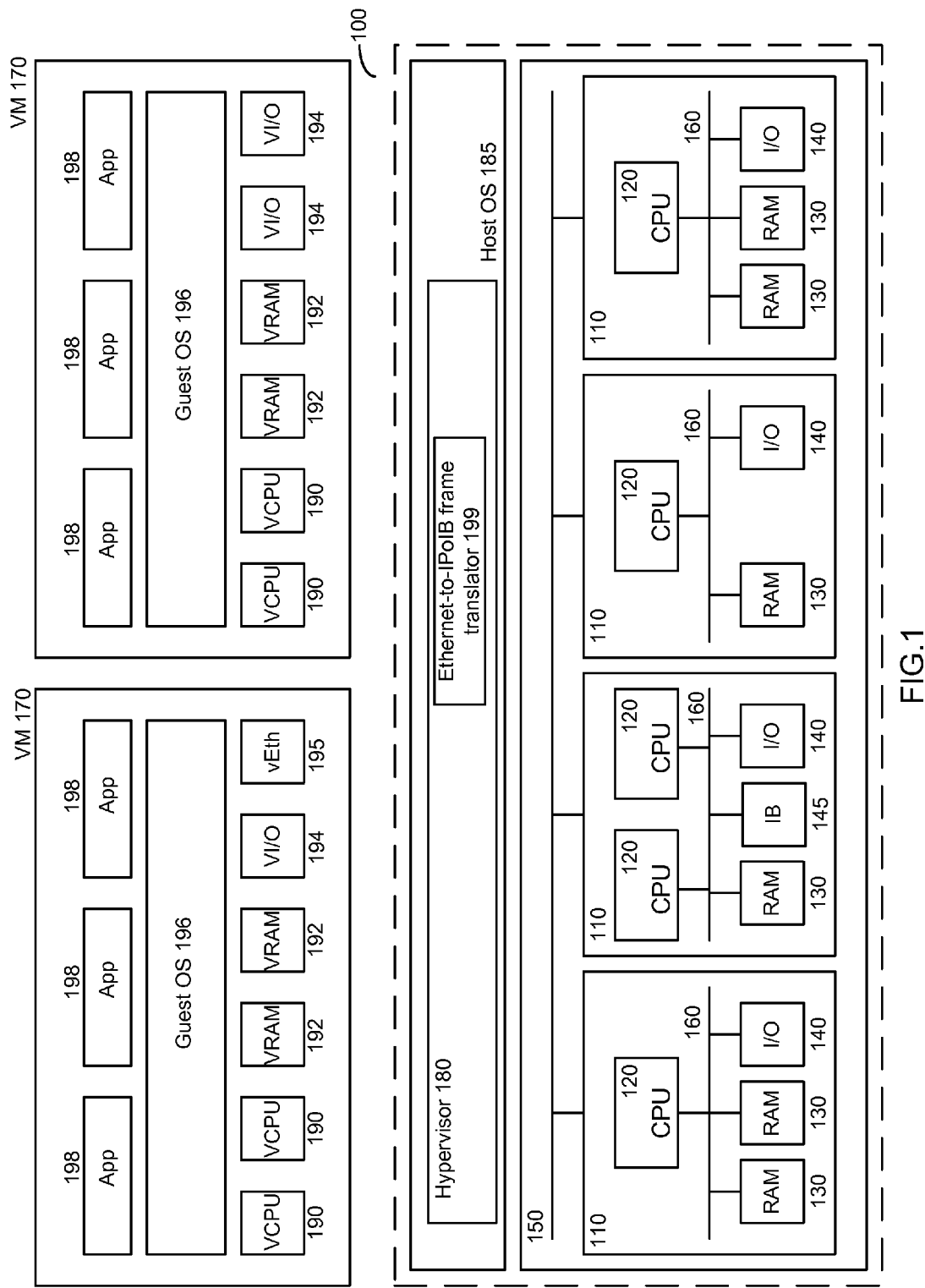
FIG. 1 depicts a high-level component diagram of an example multi-processor computer system, in accordance with one or more aspects of the present disclosure.

Described herein are methods and systems for Ethernet frame translation to Internet Protocol over Infiniband (IPoIB). The methods and systems described herein may be used, for example, by virtual machines employing virtual Ethernet interfaces and running on hardware that supports IB.

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A virtual machine may support one or more virtual Ethernet interfaces which may transmit and/or receive IP packets encapsulated within Ethernet frames to/from other virtual machines running on the same physical host computer systems and/or external computer systems. A "frame" herein shall refer to a unit of transmission in an Open System Interconnection (OSI) model layer 2 (link layer) protocol, including a link-layer header followed by a data packet.

In one example, a hypervisor may implement a virtual Ethernet switch interconnecting one or more Ethernet interfaces of the host computer system and one or more virtual Ethernet interfaces of the virtual machines running on the host computer system. The hypervisor may implement an OSI layer 2 bridge between the virtual switch and a subnet to which one of the Ethernet interfaces of the host computer system is connected, by delivering Ethernet frames between the host Ethernet interface and one or more virtual Ethernet interfaces.

IPoIB protocol defined in RFC-4391 and RFC-4392 by Internet Engineering Task Force (IETF) provides standardized IP encapsulation over IB fabric, thus allowing transparent execution of socket-based applications by routing IP packets over IB. An IPoIB packet includes an IB header, an IPoIB header, an IP header, and a payload. However, IPoIB protocol does not provide for Ethernet header encapsulation. Hence, to allow IP-based communications between two virtual machines employing virtual Ethernet interfaces and running on host systems that supports IB, the two hypervisors would need to set up OSI layer 3 routing to translate IP over Ethernet to IP over IB and then to IP over Ethernet again.

To eliminate the need for OSI layer 3 routing in the above described scenario, the present disclosure provides systems and methods for transparent Ethernet frame translation to IPoIB. The systems and methods described herein allow translating Ethernet frames to IPoIB frames and vice versa. Various aspects of the above referenced methods and systems are described in details herein below by way of examples, rather than by way of limitation.

FIG. 1 depicts a high-level component diagram of one illustrative embodiment of a multi-processor computer system 100 in accordance with one or more aspects of the present disclosure. The computer system 100 may include one or more interconnected nodes 110. Each node 110 may in turn include one or more physical processors 120 communicatively coupled to memory devices 130 and input/output (I/O) devices 140. At least one of the I/O devices may be represented by an IB host channel adapter 145 connected to an IB fabric (not shown in FIG. 1).

"Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may be referred to as a "central processing unit" (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect to a system area network 150. Local connections within each node 110, including the connections between a processor 120 and a memory 130 and between a processor 120 and an I/O device 140 may be provided by one or more local buses 160 of suitable architecture, for example, PCI.

Computer system 100 may run one or more virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194. Some virtual I/O devices may be represented by virtual Ethernet interfaces 195.

A virtual machine 170 may include multiple virtual processors 190. Processor virtualization may be implemented by the hypervisor 180 scheduling time slots on one or more physical processors 120 such that from the guest operating system's perspective those time slots are scheduled on a virtual processor 190. A virtual machine 170 may execute a guest operating system 196 which may utilize the underlying virtual devices 190, 192, 194, and 196. One or more applications 198 may be running on a virtual machine 170 under the guest operating system 196.

A virtual machine 170 may send out Ethernet frames via a virtual Ethernet interface 195. The Ethernet-to-IPoIB frame translator 199 may intercept the Ethernet frames transmitted by the virtual machine 170 and translate the frame destination addresses (e.g., media access control (MAC) addresses) to IB link layer addresses and vice versa, as described in more details herein below with references to FIG. 2.

As noted herein above, a hypervisor may implement a virtual Ethernet switch 210 interconnecting one or more Ethernet interfaces of the host computer system and one or more virtual Ethernet interfaces of the virtual machines running on the host computer system. In a further aspect, the hypervisor may implement an OSI layer 2 bridge between the virtual switch and a subnet to which one of the Ethernet interfaces of the host computer system is connected, by delivering Ethernet frames between the host Ethernet interface and one or more virtual Ethernet interfaces. To accomplish the OSI layer 2 bridging, the host Ethernet interface operating in the promiscuous mode may receive Ethernet frames addressed to the virtual Ethernet interfaces, and the hypervisor may deliver the frames to the corresponding virtual Ethernet interface. The host Ethernet interface may also respond to ARP requests incorporating IP addresses assigned to the virtual Ethernet interfaces.

In one example, the Ethernet-to-IPoIB frame translator 199 may be a part of the hypervisor 180, and may intercept Ethernet frames transmitted by a virtual machine 170 via a virtual Ethernet interface 195 before the frames would reach a virtual Ethernet switch 210. Alternatively, the Ethernet-to-IPoIB frame translator 199 may run within the host operating system 185 and may be programmed to intercept virtual machine-originated Ethernet frames transmitted by the virtual switch to a host Ethernet interface.

Figure 2:
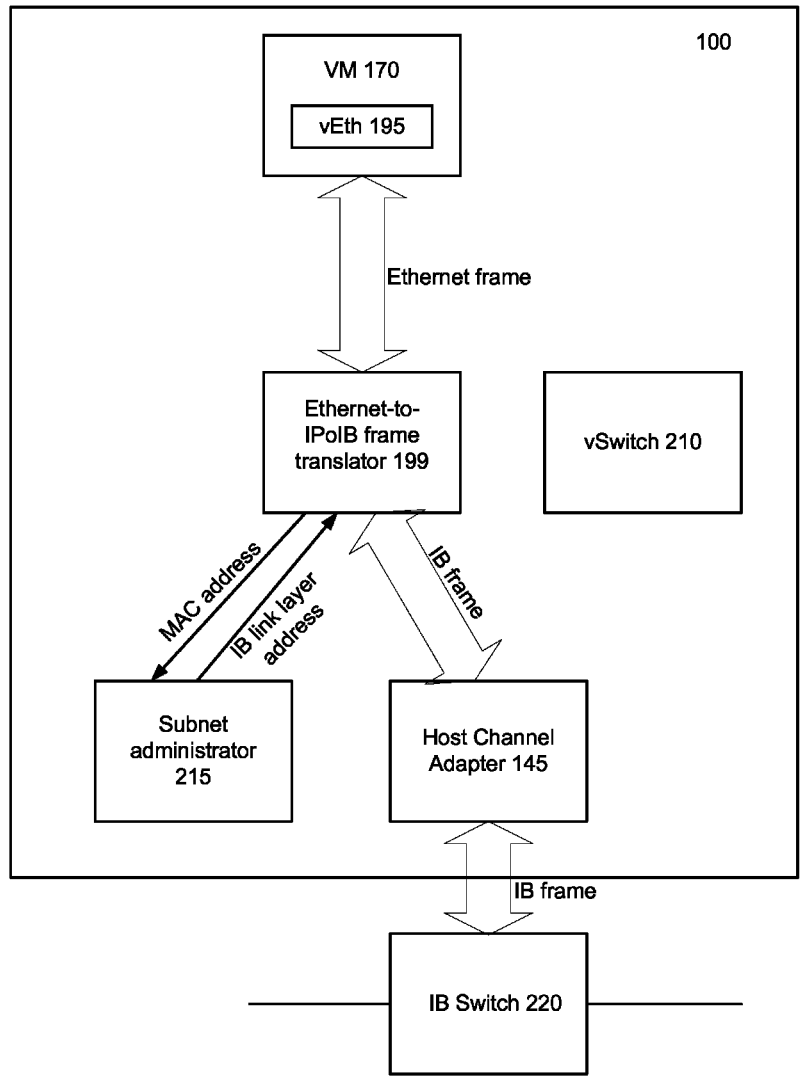
FIG. 2 schematically illustrates one implementation of the frame translation method performed by the Frame Translator component in accordance with one or more aspects of the present disclosure.

FIG. 2 schematically illustrates one implementation of the frame translation method performed by the Frame Translator component in accordance with one or more aspects of the present disclosure. The Frame Translator 199 may register a virtual Ethernet interface with a subnet administrator component 215 residing on the computer system 100. The subnet administrator component may be a part of the subnet manager for the IB subnet to which the host IB interface 145 belongs. Alternatively, the subnet administrator component may be implemented on an IB node which is different from the node where the subnet manager resides.

The Frame Translator 199 may transmit a link layer address registration request message to the subnet administrator component 215 upon a pre-defined change in the state of the virtual Ethernet interface, such as the interface coming on line, the link status of the virtual Ethernet interface being changed, or the media access control (MAC) address of the virtual Ethernet interface being changed. The registration request message may include the link layer address of the virtual Ethernet interface which may be represented by an OSI layer 2 address, including, for example, an Ethernet media access control (MAC) address, a virtual local area network (VLAN) address, or a virtual extensible local area network (VXLAN) address. Responsive to receiving a registration request message containing a link layer address of a virtual interface, the subnet administrator component 215 may assign an IB link layer address corresponding to the virtual link layer address, and store the address mapping in a data structure residing in a memory. Alternatively, the registration request message can contain both the virtual interface link layer address and the corresponding IB link layer address.

In one example, the subnet administrator component may produce an IEEE EUI-64-compliant extended unique identifier (EUI) based on the MAC address of the virtual Ethernet interface, and concatenate the EUI with a prefix to produce a GID. The subnet administrator component may construct an IB link layer address by the GID with an arbitrarily chosen QPN. Alternatively, the mapping of Ethernet MAC addresses to IB link layer addresses may be performed by the subnet administrator component statically, without requiring each virtual Ethernet interface to register with the SA, and independently of a particular virtual Ethernet interface status. Mapping virtual interface link layer addresses to IB link layer address by the subnet administrator component provides consistency and uniqueness of the mapping across the IB subnet in which the subnet administrator component operates.

Figure 3:
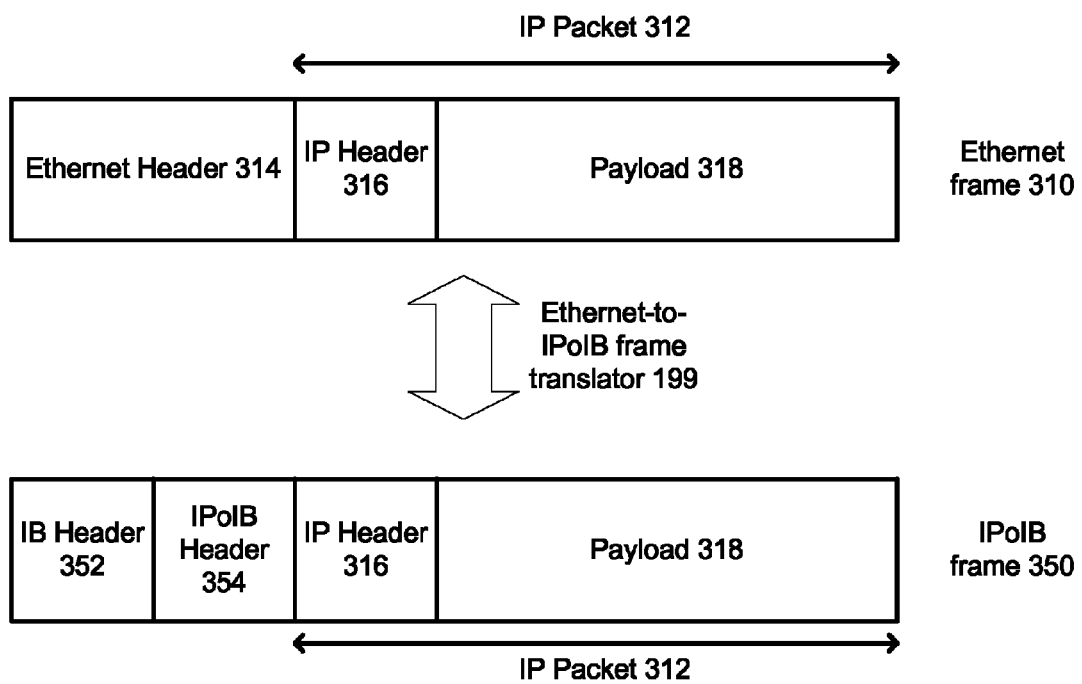
FIG. 3 schematically illustrates examples of frames processed by the Frame Translator component in accordance with one or more aspects of the present disclosure.

FIG. 3 schematically illustrates examples of frames processed by the Frame Translator component in accordance with one or more aspects of the present disclosure. The Frame Translator may receives an Ethernet frame 310 originated by a virtual machine running on the computer system 100 of FIG. 1. The Ethernet frame 310 encapsulates a payload represented by an IP packet 312 preceded by an Ethernet header 314. The Ethernet header includes source and destination MAC addresses. The IP packet comprises an IP header 316 and a payload 318; the payload 318 may optionally include a transport layer header (such as, for example, TCP or UDP). Responsive to receiving the Ethernet frame 310, the Frame Translator may query the subnet administrator component for an IB link layer address corresponding to the destination MAC address. In one example, the destination link layer address may be represented by a multicast address. The subnet administrator component may return an IB link layer address corresponding to the multicast address.

Upon receiving from the subnet administrator component a response including an IB link layer address corresponding to the destination MAC address, the Frame Translator may encapsulate the payload represented by the IP packet 312 into an IPoIB frame 350. The IB frame 350 includes an IB header 352 comprising source and destination IB link layer addresses, IPoIB header 354, and a payload represented by the IP packet 312. Upon completing the encapsulation, the Frame Translator may forward the frame to the host's IB interface for sending to the destination address.

Responsive to receiving an IPoIB frame addressed to one or more virtual machines running on the computer system 100 of FIG. 1, the Frame Translator may query the IB subnet administrator component for a destination link layer address corresponding to the IB link layer address. In one example, the IB link layer address may be represented by a multicast address. The subnet administrator component may return a destination link layer address corresponding to the IB multicast address.

Upon receiving from the subnet administrator component a response including a destination MAC address corresponding to the IB link layer address, the Frame Translator may encapsulate the payload 318 of the IPoIB frame 350 into a network frame 310 (e.g., Ethernet frame), and forward the frame 310 to one or more network interfaces associated with one or more virtual machines executing on the computer system 100.

Figure 4:
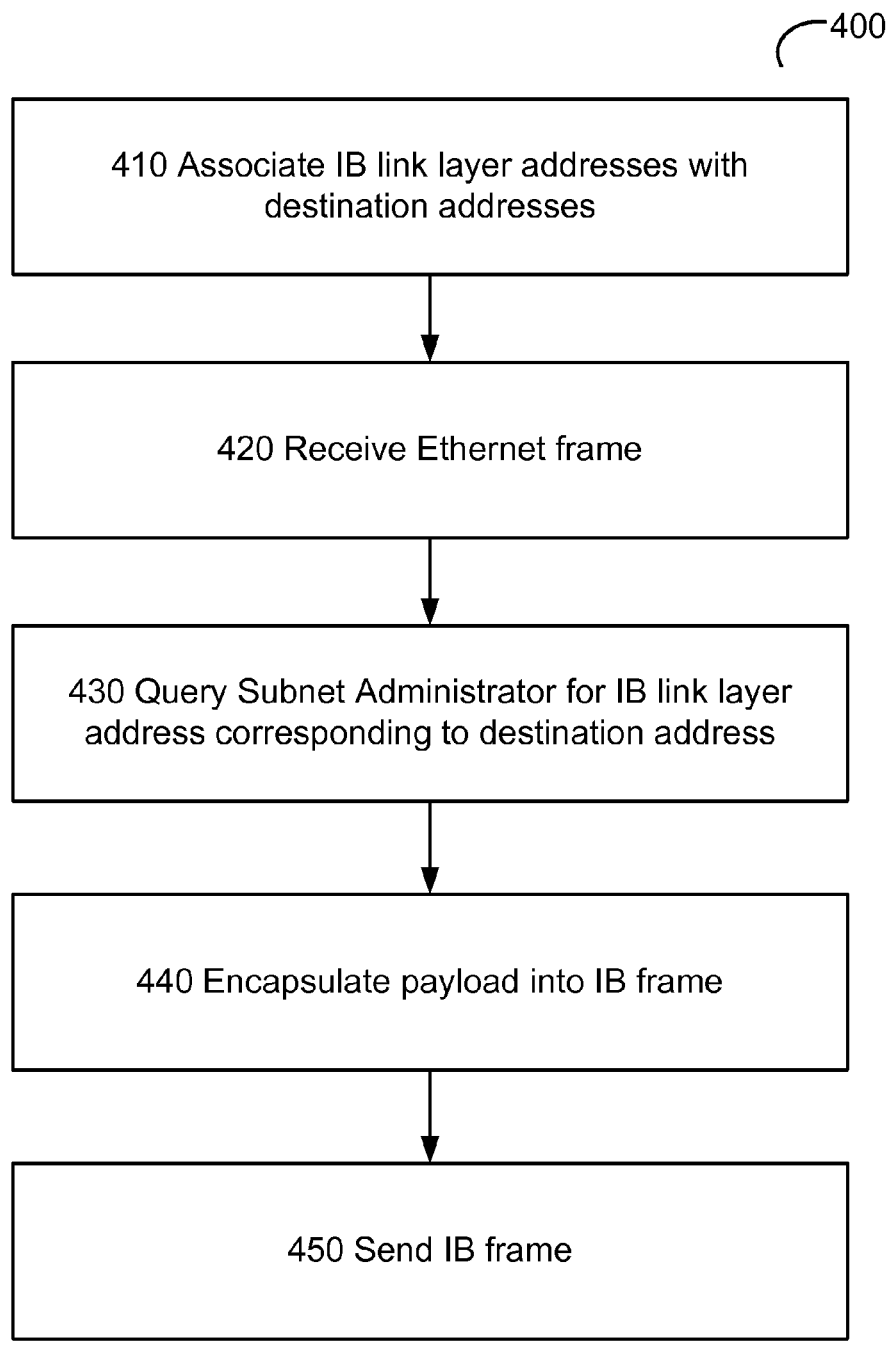
FIGS. 4-5 depict flow diagrams of methods for Ethernet frame translation to IPoIB and vice versa, in accordance with one or more aspects of the present disclosure.
Figure 5:
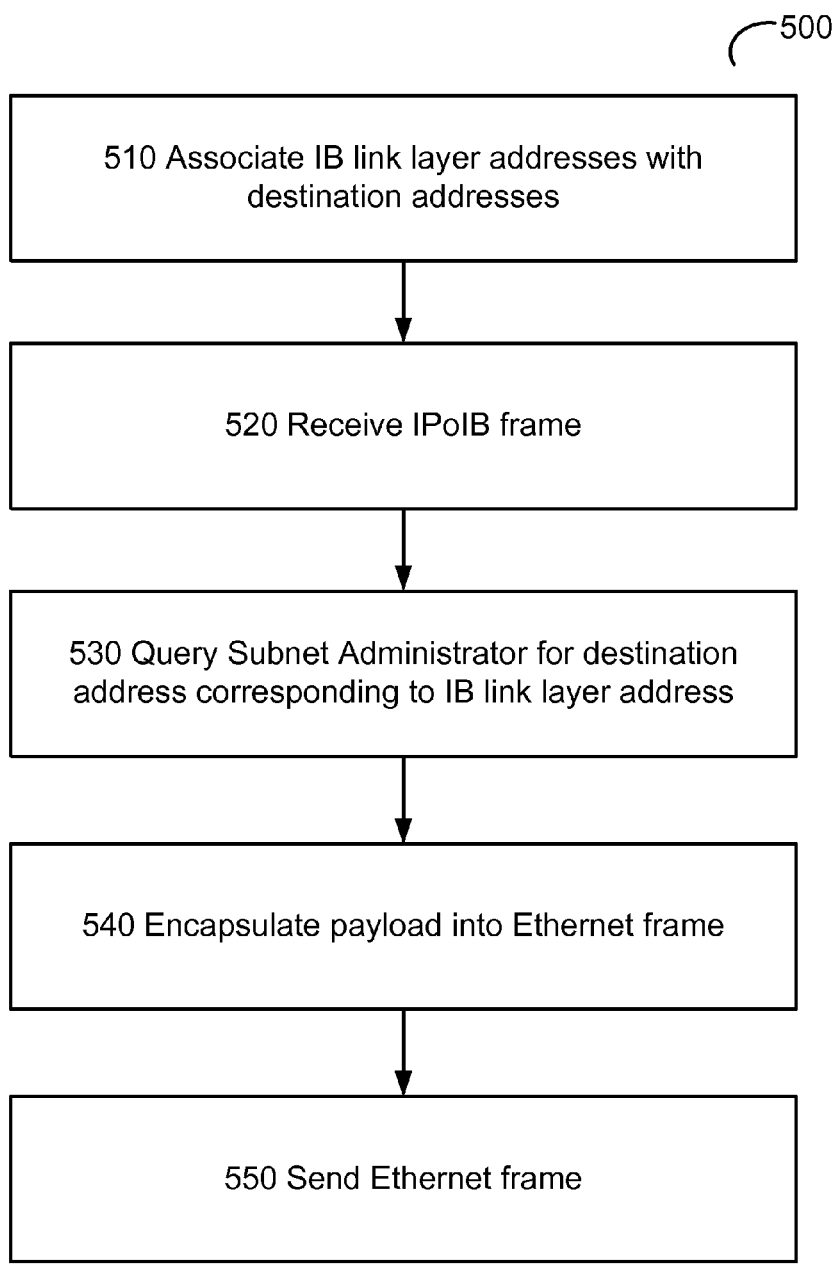

FIGS. 4-5 depict flow diagrams of methods for Ethernet frame translation to IPoIB and vice versa, in accordance with one or more aspects of the present disclosure. The methods 400 and 500 may be performed by a computer system that may comprise hardware (e.g., circuitry, dedicated logic, and/or programmable logic), software (e.g., instructions executable on a computer system to perform hardware simulation), or a combination thereof. The methods 400 and 500, and/or each of their respective individual functions, routines, subroutines, or operations may be performed by one or more physical processors of the computer system executing the method.

In one implementation, as illustrated by FIG. 4, method 400 may be performed by a hypervisor executing on the computer system 100 of FIG. 1, for processing network frames (e.g., Ethernet frames) originated by one or more virtual machines running on the computer system 100. Responsive to receiving a network frame comprising a payload (e.g., represented by an IP packet) and a header including a destination address, the method may query the subnet administrator component for an IB link layer address corresponding to the destination address, encapsulate the payload into an IPoIB frame, and forward the IPoIB frame to the host's IB interface for sending to the destination address.

Referring to FIG. 4, at block 410, a subnet administrator component associates a plurality of IB link layer addresses with a plurality of destination addresses. As noted herein above, the subnet administrator component may reside on an IB switch or on an end-point connected to an IB switch, e.g., on a computer system connected to an IB switch. A destination address may be represented by an OSI layer 2 address, including, for example, an Ethernet media access control (MAC) address, a VLAN address, or a VXLAN address.

At block 420, a Frame Translator running on a computer system receives a network frame comprising a payload and a header including a destination address. In one example, the network frame may be represented by an Ethernet frame comprising a payload and an Ethernet header including an Ethernet MAC address. The network frame may be originated by a virtual network interface (e.g., a virtual Ethernet interface) of a virtual machine running on the computer system.

At block 430, the Frame Translator queries the subnet administrator component for an IB link layer address corresponding to the destination address.

At block 440, the Frame Translator encapsulates the payload into an IPoIB frame including the IB link layer address.

At block 450, the computer system sends the IPoIB frame to the IB link layer address. Upon completing the operations schematically described by block 450, the method may terminate.

In one implementation, as illustrated by FIG. 5, method 500 may be performed by a hypervisor executing on the computer system 100 of FIG. 1, for processing IPoIB packets received by the IB interface of the host computer system 100 and addressed to one or more virtual machines running on the computer system 100. Responsive to receiving an IPoIB frame comprising an IP packet and a header including a destination address, the method may query the IB subnet administrator component for a destination address corresponding to the IB link layer address, encapsulate the payload into a network frame (e.g., Ethernet frame), and forward the frame to one or more network interfaces associated with one or more virtual machines executing on the computer system 100.

Referring to FIG. 5, at block 510, a subnet administrator component associates a plurality of IB link layer addresses with a plurality of destination addresses. As noted herein above, the subnet administrator component may reside on an IB switch or on an end-point connected to an IB switch, e.g., on a computer system connected to an IB switch. A destination address may be represented by an OSI layer 2 address, including, for example, an Ethernet media access control (MAC) address, a VLAN address, or a VXLAN address.

At block 520, the computer system receives, via an IB interface, an IPoIB frame comprising a payload and a header including an IB link layer address. The network frame may be addressed to one or more virtual machines running on the computer system.

At block 530, the Frame Translator queries the subnet administrator component for a destination address corresponding to the IB link layer address.

At block 540, the Frame Translator encapsulates the payload into a network frame including the destination address. In one example, the network frame may be represented by an Ethernet frame comprising a payload and an Ethernet header including an Ethernet MAC address.

At block 550, the Frame Translator sends the network frame to one or more virtual machines identified by the destination address. Upon completing the operations schematically described by block 550, the method may terminate.

Figure 6:
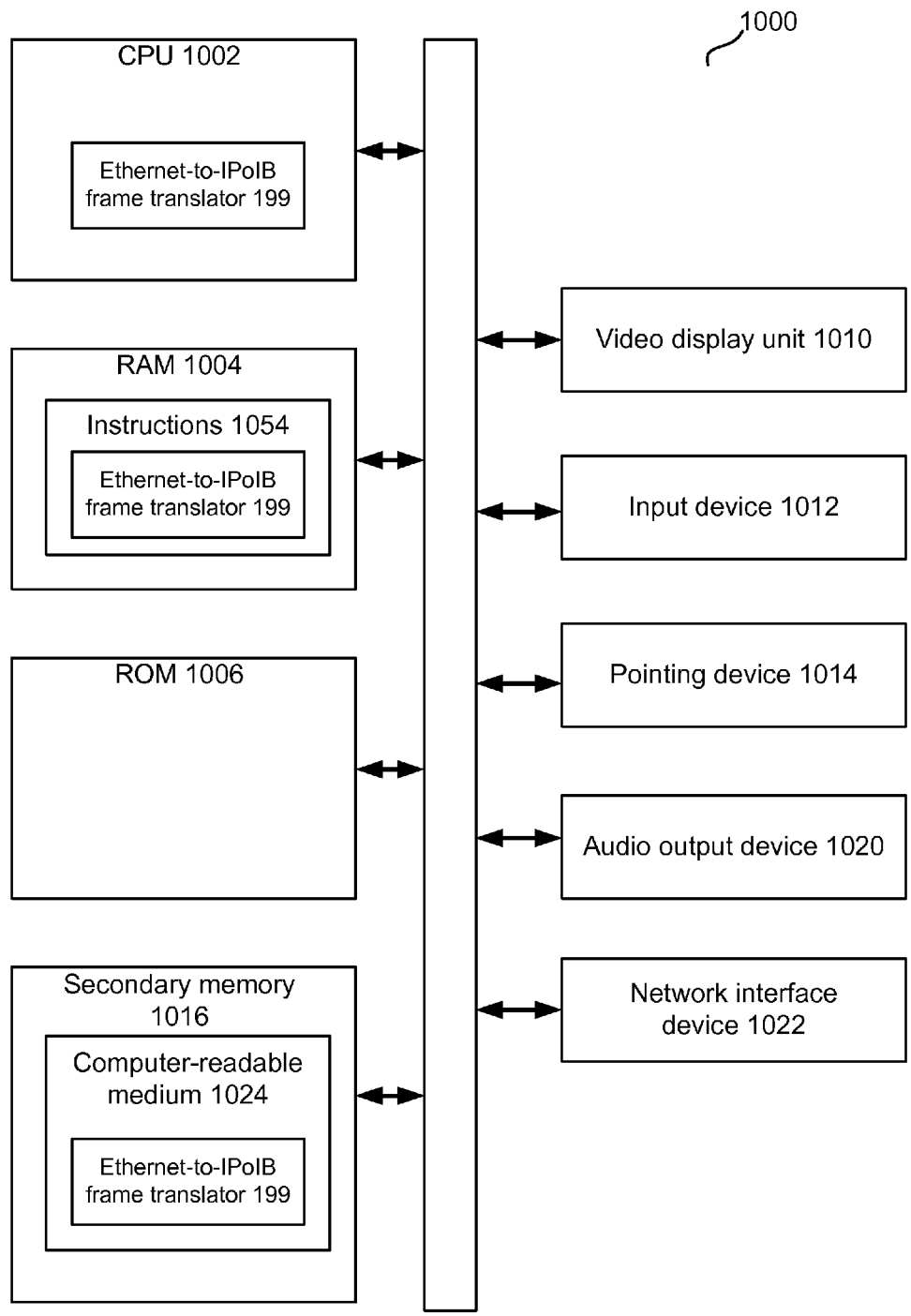
FIG. 6 depicts a block diagram of an illustrative computer system operating in accordance with examples of the invention.

FIG. 6 depicts an example computer system 1000 which may perform any one or more of the methods described herein. In one example, computer system 1000 may correspond to host computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions 1054 encoding any one or more of the methods or functions described herein, including the example method 400 for Ethernet frame translation to IPoIB. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein, including the example method 400 for Ethernet frame translation to IPoIB. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
   receiving, by a processor, an Ethernet frame comprising a payload and a header, wherein the header comprises a destination Media Access Control (MAC) address;
   determining an Infiniband (IB) link layer address comprising a subnet-specific prefix and an identifier string derived from the destination MAC address; and
   encapsulating the payload into an Infiniband over Internet Protocol (IPoIB) frame comprising the IB link layer address.

2. The method of claim 1, wherein the destination MAC address is represented by one of: an Ethernet address, a virtual local area network (VLAN) address, or a virtual extensible local area network (VXLAN) address.

3. The method of claim 1, further comprising associating, by an IB subnet administrator component, a plurality of IB link layer addresses with a plurality of destination MAC addresses.

4. The method of claim 1, further comprising registering, with an IB subnet administrator component, a network interface identified by the destination MAC address.

5. The method of claim 1, wherein the destination MAC address is represented by a multicast address.

6. The method of claim 1, wherein the Ethernet frame is originated by a virtual machine being executed by the processor.

7. A method, comprising:
receiving, by a processor, an Infiniband over Internet Protocol (IPoIB) packet comprising a payload and a header, wherein the header comprises an Infiniband (IB) link layer address, and wherein the IB link layer address comprises a subnet-specific prefix and an identifier string;
determining a destination Media Access Control (MAC) address corresponding to the identifier string; and
encapsulating the payload into an Ethernet frame comprising the destination MAC address.

8. The method of claim 7, wherein the destination MAC address is represented by one of: an Ethernet address, a virtual local area network (VLAN) address, or a virtual extensible local area network (VXLAN) address.

9. The method of claim 7, further comprising associating, by an IB subnet administrator component, a plurality of IB link layer addresses with a plurality of destination MAC addresses.

10. The method of claim 7, further comprising registering, with an IB subnet administrator component, a network interface identified by the destination MAC address.

11. The method of claim 7, wherein the destination MAC address is represented by a multicast address; and
wherein the IB link layer address is represented by an IB link layer multicast address corresponding to the destination multicast address.

12. The method of claim 7, wherein the Ethernet frame is originated by a virtual machine being executed by the processor.

13. A computer-readable non-transitory medium comprising executable instructions to cause a processor to:
receive, by the processor, an Ethernet frame comprising a payload and a header, wherein the header comprises a destination Media Access Control (MAC) address;
determine an Infiniband (TB) link layer address comprising a subnet-specific prefix and an identifier string derived from the destination MAC address; and
encapsulate the payload into an Infiniband over Internet Protocol (IPoIB) frame comprising the IB link layer address.

14. The computer-readable non-transitory medium of claim 13, wherein the destination MAC address is represented by one of: an Ethernet address, a virtual local area network (VLAN) address, or a virtual extensible local area network (VXLAN) address.

15. The computer-readable non-transitory medium of claim 13, further comprising executable instructions to cause the processor to:
associate, by an IB subnet administrator component, a plurality of IB link layer addresses with a plurality of destination MAC addresses.

16. The computer-readable non-transitory medium of claim 13, further comprising executable instructions to cause the processor to:
register with an IB subnet administrator a network interface identified by the destination MAC address.

17. The computer-readable non-transitory medium of claim 13, wherein the destination MAC address is represented by a multicast address; and
wherein the IB link layer address is represented by an IB link layer multicast address corresponding to the destination multicast address.

18. The computer-readable non-transitory medium of claim 13, wherein the Ethernet frame is originated by a virtual machine being executed by the processor.

19. A system comprising:
a memory; and
a processor, coupled to the memory, to:
receive an Ethernet frame comprising a payload and a header, wherein the header comprises a destination Media Access Control (MAC) address;
determine an Infiniband (IB) link layer address comprising a subnet-specific prefix and an identifier string derived from the destination MAC address; and
encapsulate the payload into an Infiniband over Internet Protocol (IPoIB) frame comprising the IB link layer address.

20. The system of claim 19, wherein the destination MAC address is represented by one of: an Ethernet address, a virtual local area network (VLAN) address, or a virtual extensible local area network (VXLAN) address.

21. The system of claim 19, wherein the processor is to associate a plurality of IB link layer addresses with a plurality of destination MAC addresses.

22. The system of claim 19, wherein the processor is to register a network interface identified by the destination MAC address with the IB subnet administrator.

23. The system of claim 19, wherein the destination MAC address is represented by a multicast address; and
wherein the IB link layer address is represented by an IB link layer multicast address corresponding to the destination multicast address.

24. The system of claim 19, wherein the Ethernet frame is originated by a virtual machine being executed by the processor.

25. The method of claim 5, wherein the IB link layer address is represented by an IB link layer multicast address corresponding to the destination multicast address.

* * * * *